(12) United States Patent
Wang

(10) Patent No.: US 10,030,726 B1
(45) Date of Patent: Jul. 24, 2018

(54) BRAKE DISC STRUCTURE

(71) Applicant: Huang-Chieh Metal Composite Material Tech. Co., Ltd., New Taipei (TW)

(72) Inventor: Chin-Han Wang, New Taipei (TW)

(73) Assignee: HUANG-CHIEH METAL COMPOSITE MATERIAL TECH. CO., LTD., New Taipei (TW)

( * ) Notice: Subject to any disclaimer, the term of this patent is extended or adjusted under 35 U.S.C. 154(b) by 0 days.

(21) Appl. No.: 15/591,988

(22) Filed: May 10, 2017

(51) Int. Cl.
*F16D 65/12* (2006.01)
*F16D 65/02* (2006.01)

(52) U.S. Cl.
CPC ......... *F16D 65/125* (2013.01); *F16D 65/128* (2013.01); *F16D 2065/132* (2013.01); *F16D 2065/134* (2013.01); *F16D 2065/1328* (2013.01); *F16D 2200/003* (2013.01); *F16D 2200/0013* (2013.01); *F16D 2200/0017* (2013.01); *F16D 2200/0021* (2013.01); *F16D 2250/0061* (2013.01)

(58) Field of Classification Search
CPC ...... F16D 65/12; F16D 65/125; F16D 65/122; F16D 2065/132; F16D 2065/1328; F16D 2065/134; F16D 2200/0013; F16D 2200/0017; F16D 2200/0021; F16D 2200/0003; F16D 2250/0061
See application file for complete search history.

(56) References Cited

U.S. PATENT DOCUMENTS

| 2008/0060891 A1* | 3/2008 | Chen ................. F16D 65/122 188/218 XL |
| 2013/0186719 A1* | 7/2013 | Yu .......................... F16D 65/12 188/218 XL |

\* cited by examiner

*Primary Examiner* — Melanie Torres Williams

(57) ABSTRACT

A brake disc structure contains: a central disc made of metal material or metal alloy material, a first disc and a second disc which are made of ferrous metal materials, and a through orifice passing through central positions of the first disc, the central disc, and the second disc. The first disc includes a first brake face and plural first holes, the second disc includes a second brake and plural second holes, and the central disc includes plural third holes, wherein each of the plural first and second holes has a first diameter and a second diameter less than the first diameter, and diameters of any two adjacent first and second holes are different. Furthermore, multiple heat dissipation portions of the central disc are defined by the plural third holes and the plural first holes or are defined by the plural third holes and the plural second holes.

14 Claims, 5 Drawing Sheets

BRAKE DISC STRUCTURE

FIELD OF THE INVENTION

The present invention relates to a brake disc structure which has light weight, wear resistance, and heat dissipation.

BACKGROUND OF THE INVENTION

A brake disc structure is disclosed in TW Patent No. I312392 and contains a first disc and a second disc, wherein the first disc is made of iron, and the second disc is made of aluminum alloy.

A disk brake rotor is disclosed in U.S. Pat. No. 8,522,931B2 and includes a first rotor portion, a second rotor portion and a third rotor portion. The second rotor portion has an annular portion and at least one ventilation hole. The third rotor portion also has an annular portion. The first portion is attached to and disposed between the second rotor portion and the third rotor portions, such that a surface of the first rotor portion is an exposed area exposed by the at least one ventilation hole. The first rotor portion is made of aluminum or aluminum alloy, and the second and third rotor portions are made of stainless steel. The exposed area of the first rotor portion is not supported by the second and third rotor portions, so the first rotor portion is broken and deformed easily after a period of using time.

The present invention has arisen to mitigate and/or obviate the afore-described disadvantages.

SUMMARY OF THE INVENTION

The primary objective of the present invention is to provide a brake disc structure which has light weight, wear resistance, and heat dissipation To obtain above-mentioned objective, a brake disc structure provided by the present invention contains: a central disc made of metal material or metal alloy material, a first disc and a second disc which are made of ferrous metal materials, and a through orifice passing through central positions of the first disc, the central disc, and the second disc.

The first disc is connected with a first surface of the central disc, and the second disc is coupled with a second surface of the central disc.

The brake disc structure further contains a through orifice passing through central positions of the first disc, the central disc, and the second disc.

The first disc includes a first brake face away from the first surface of the central disc, and the second disc includes a second brake face away from the second surface of the central disc.

The first disc includes plural first holes, the second disc includes plural second holes, the central disc includes plural third holes, each of the plural first and second holes has a first diameter and a second diameter less than the first diameter, and diameters of any two adjacent first and second holes are different, some of the plural first holes having a larger diameter align with some of the plural second holes having a smaller diameter, and the other of the plural first holes shaving a smaller diameter align with the other the plural second holes having a larger diameter, wherein a diameter of each of the plural third hole is equal to the second diameter of each first hole and each second hole.

Multiple heat dissipation portions of the central disc are defined by the plural third holes of the central disc and the plural first holes of the first disc or are defined by the plural third holes of the central disc and the plural second holes of the second disc.

DETAILED DESCRIPTION OF THE PREFERRED EMBODIMENTS

Figure 1:
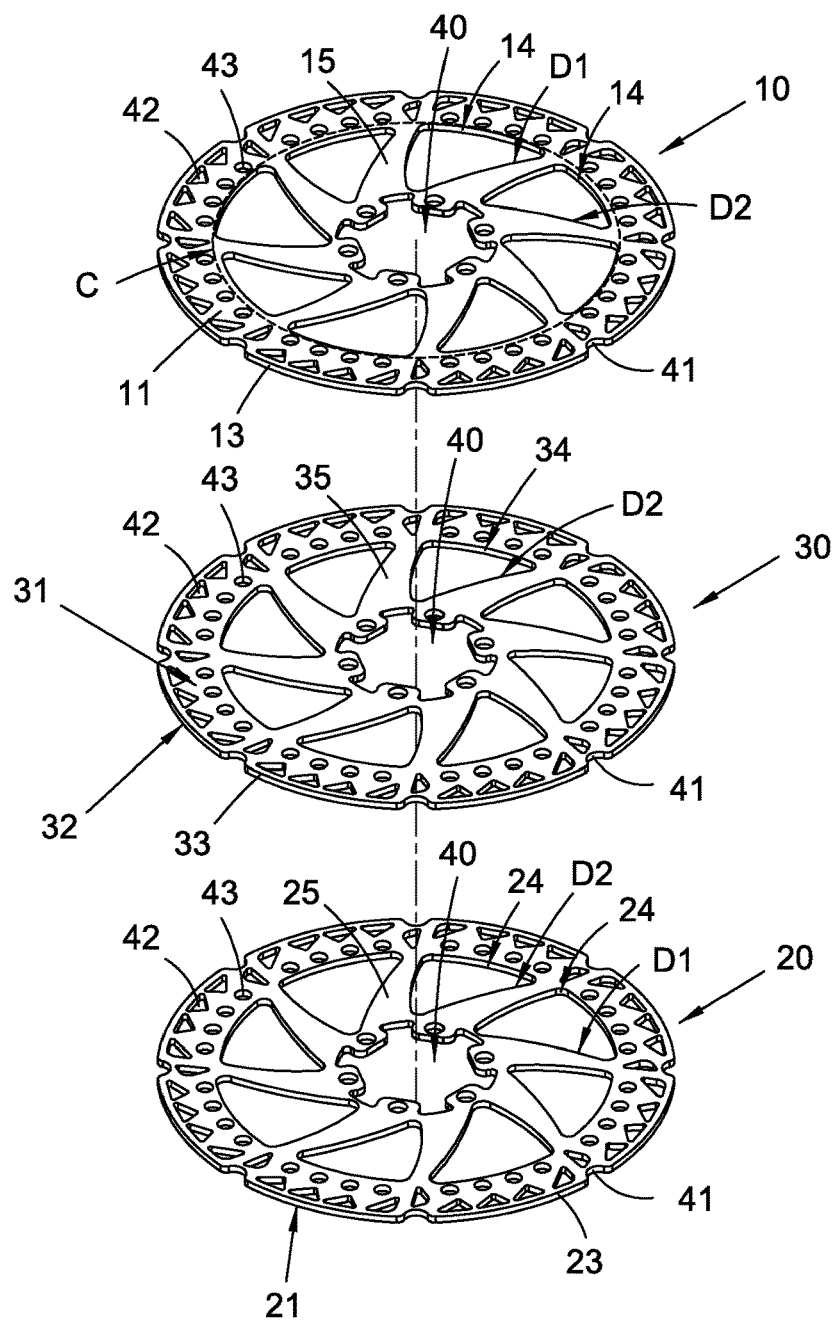
FIG. 1 is a perspective view showing the exploded components of a brake disc structure according to a first embodiment of the present invention.
Figure 2:
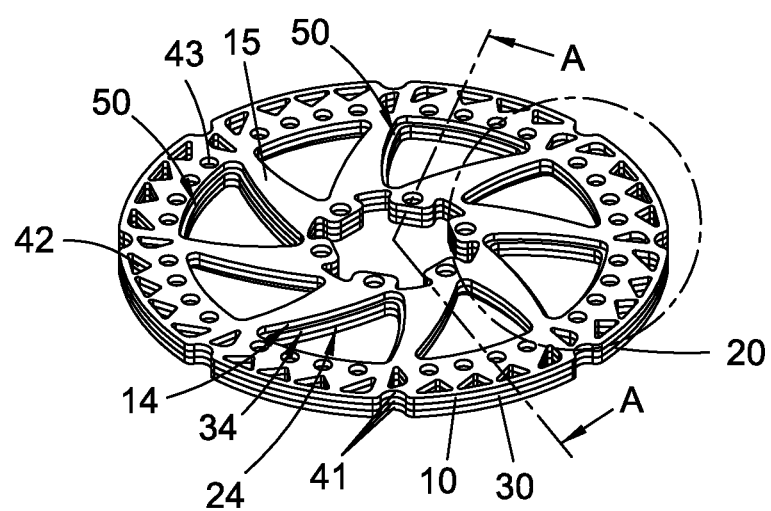
FIG. 2 is a perspective view showing the assembly of the brake disc structure according to the first embodiment of the present invention.

With reference to FIGS. 1 and 2, a brake disc structure according to a first embodiment of the present invention comprises: a central disc 30 made of metal material or metal alloy material, a first disc 10 and a second disc 20 which are made of ferrous metal materials, wherein the first disc 10 is connected with a first surface 31 of the central disc 30, and the second disc 20 is coupled with a second surface 32 of the central disc 30. Preferably, the first disc 10 is connected with the first surface 31 in a metallurgical reaction manner, and the second disc 20 is coupled with the second surface 32 in the metallurgical reaction manner. The brake disc structure further comprises a through orifice 40 passing through central positions of the first disc 10, the central disc 30, and the second disc 20.

The metallurgical reaction manner includes any one of roll forming, press forming, and diffusing forming. A density of the metal material or the metal alloy material is less than 4 g/cm3, and the metal material or the metal alloy material includes any one of magnesium, aluminum, titanium, magnesium alloys, aluminum alloys, and titanium alloys. The ferrous metal materials include cast iron and stainless steel so as to obtain light weight and wear resistance of the brake disc structure.

In the first embodiment, each of the central disc 30, the first disc 10, and the second disc 20 is in a circular disk shape, the central disc 30 includes a first external rim 33, the first disc 10 includes a second external rim 13, and the second disc 20 includes a third external rim 23, wherein each of the first, second, and third external rims 33, 13, 23 has plural arcuate cutouts 41, and the plural arcuate cutouts 41 of the first external rim 33 of the central disc 30 align with the plural arcuate cutouts 41 of the second external rim 13 of the first disc 10 and the plural arcuate cutouts 41 of the third external rim 23 of the second disc 20.

Figure 5:
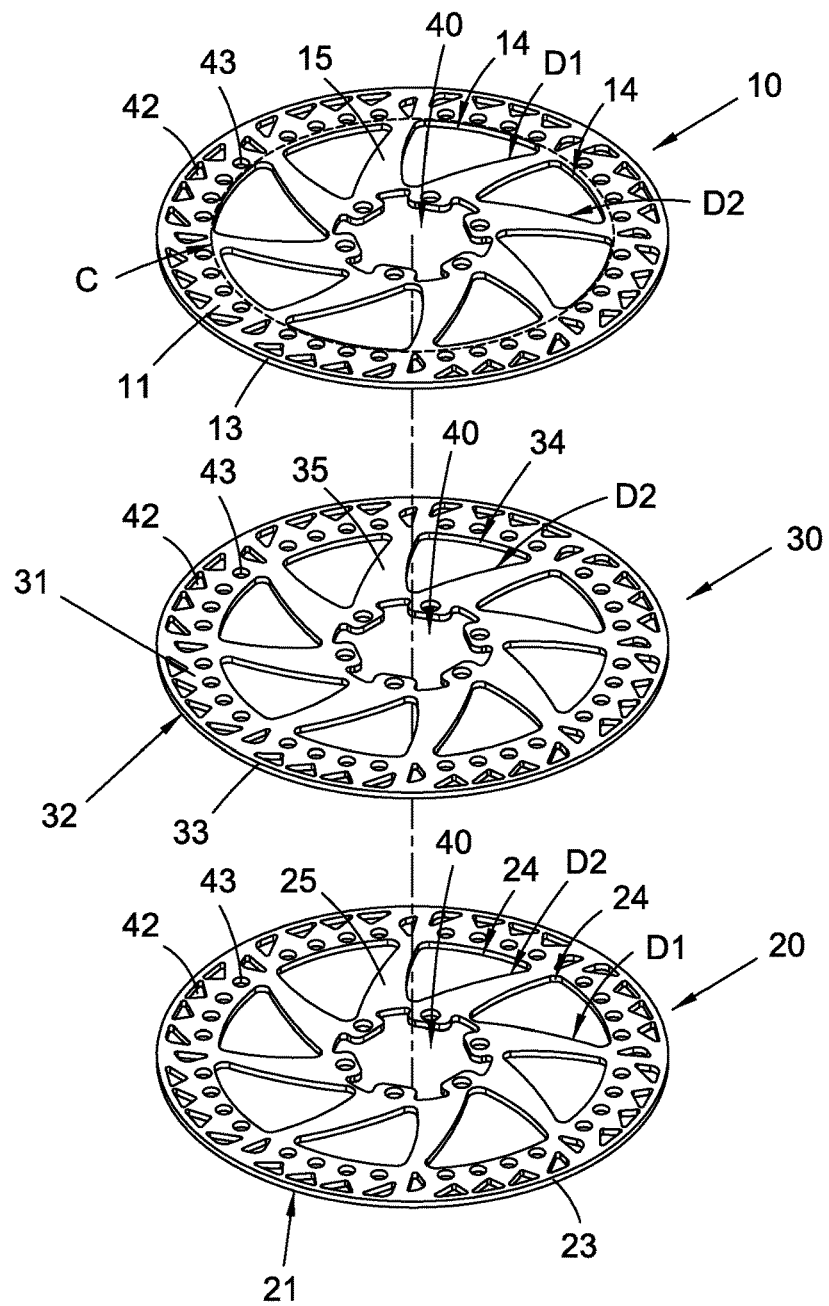
FIG. 5 is a perspective view showing the exploded components of a brake disc structure according to a second embodiment of the present invention.

As shown in FIG. 5, in a second embodiment, each of the central disc 30, the first disc 10, and the second disc 20 is in a circular disk shape, and the central disc 30 includes a first external rim 33, the first disc 10 includes a second external rim 13, and the second disc 20 includes a third external rim 23, wherein each of the first, second, and third external rims 33, 13, 23 does not has plural arcuate cutouts 41 of the first embodiment.

Figure 4:
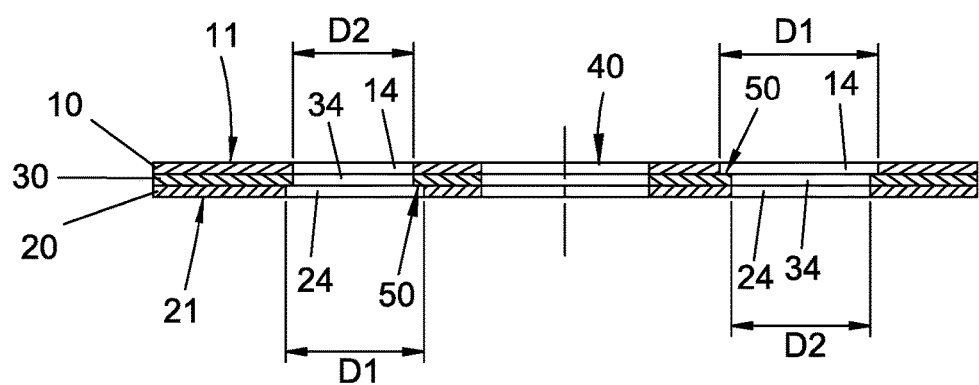
FIG. 4 is a cross sectional view taken along line A-A of FIG. 2.

The first disc 10 includes a first brake face 11 away from the first surface 31 of the central disc 30, and the second disc 20 includes a second brake face 21 away from the second surface 32 of the central disc 30 (as illustrated in FIG. 4), wherein each of the first brake face 11 and the second brake face 21 is configured to contact with a brake lining of a disc brake system, the first brake face 11 is defined by the second external rim 13 and a round line C of the first disc 10, wherein a center of the round line C of the first disc 10 is located at a central position of the through orifice 40, and the second brake face 21 is defined by the second external rim 23 and a round line C of the second disc 20, wherein a center of the round line C of the second disc 20 is located at the central position of the through orifice 40. Each of the first and second brake faces 11, 21 has multiple openings 42 passing therethrough and adjacent to the second external rim 13 and the third external rim 23 so that the brake disc structure rotates stably.

Each of the first and second brake faces 11, 21 has multiple apertures 43 passing therethrough and located adjacent to the two round lines C of the first disc 10 and the second disc 20, wherein the multiple apertures 43 are defined among the multiple openings 42 and the through orifice 40 and are evenly arranged around the through orifice 40 so that the brake disc structure rotates stably.

The first disc 10 includes plural first holes 14 separated from one another and surrounding the through orifice 40, wherein any two adjacent of the plural first holes 14 is defined a first rib 15, each of the plural first holes 14 has a first diameter D1 and a second diameter D2 less than the first diameter D1, and diameters of any two adjacent first holes 14 are different.

The second disc 20 includes plural second holes 24 separated from one another and surrounding the through orifice 40, and a number of the plural second holes 24 is equal to that of the plural first holes 14, wherein any two adjacent of the plural second holes 24 is defined a second rib 25, each of the plural second holes 24 has the first diameter D1 and the second diameter D2 less than the first diameter D1, and the diameters of any two adjacent second holes 24 are different. In addition, centers of the plural first holes 14 of the first disc 10 align with centers of the plural second holes 24 of the second disc 20 respectively. Some of the plural first holes 14 having a larger diameter align with some of the plural second holes 24 having a smaller diameter, and the other of the plural first holes 14 having a smaller diameter align with the other the plural second holes 24 having a larger diameter.

The central disc 30 includes plural third holes 34 separated from one another and surrounding the through orifice 40, and a number of the plural third holes 34 is equal to that of each of the plural first holes 14 and the plural second holes 24, wherein any two adjacent of the plural third holes 24 is defined a third rib 35, and each of the third holes 34 aligns with each first hole 14 and each second hole 24. A diameter of each third hole 34 is equal to the second diameter D2 of each first hole 14 and each second hole 24. In addition, each first hole 14, each second hole 24, and each third hole 34 are respectively defined by multiple arcuate lines so as to form an irregular shape, and shapes of each first hole 14, each second hole 24, and each third hole 34 are identical. Centers of the plural third holes 34 of the central disc 30 align with centers of the plural first holes 14 and the plural second holes 24 respectively. Each of the multiple openings 42, the multiple apertures 43, the plural first holes 14, the plural second holes 24, and the plural third holes 34 is in any one of a circular shape, a polygonal shape, and an irregular shape. Shapes of the plural first holes 14, the plural second holes 24, and the plural third holes 34 are identical, wherein the first rib 15, the second rib 25, and the third rib 35 reinforce the first disc 10, the second disc 20, and the third disc 30 individually and reduce weights of the first disc 10, the second disc 20, and the third disc 30 respectively.

Figure 3:
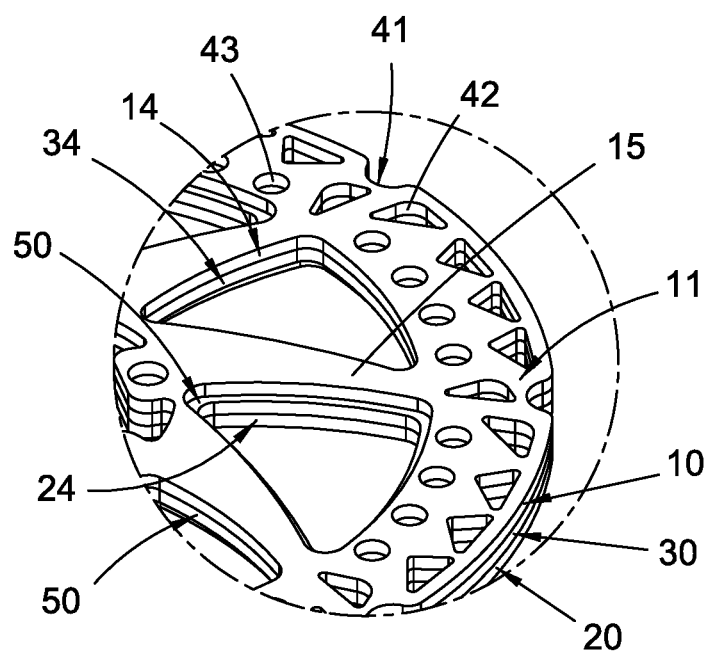
FIG. 3 is a perspective view of a part of FIG. 2.

Thereby, multiple heat dissipation portions 50 of the central disc 30 are defined by the plural third holes 34 of the central disc 30 and the plural first holes 14 of the first disc 10 or are defined by the plural third holes 34 of the central disc 30 and the plural second holes 24 of the second disc 20 (as shown in FIG. 3). The multiple heat dissipation portions 50 contact with air which flows through the plural first holes 14, the plural second holes 24, and the plural third holes 34 so as to quickly remove heat of the brake disc structure by way of the central disc 30 (because the central disc 30 is made of the metal material or the metal alloy material).

Preferably, the multiple heat dissipation portions 50 of the central disc 30 partially connect with the first disc 10 and the second disc 20 so as to avoid deformation and spall as removing the heat of the brake disc structure.

In another embodiment, the central disc 30 does not include the plural third holes 34 so as to increase a heat dissipation area as the central disc 30 aligns with the plural first holes 14 and the plural second holes 24.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A brake disc structure comprising: a central disc made of metal material or metal alloy material, a first disc and a second disc which are made of ferrous metal materials;
   wherein the first disc is connected with a first surface of the central disc, and the second disc is coupled with a second surface of the central disc;
   wherein the brake disc structure further comprises a through orifice passing through central positions of the first disc, the central disc, and the second disc;
   wherein the first disc includes a first brake face away from the first surface of the central disc, and the second disc includes a second brake face away from the second surface of the central disc;
   wherein the first disc includes plural first holes, the second disc includes plural second holes, the central disc includes plural third holes, each of the plural first and second holes has a first diameter and a second diameter less than the first diameter, and diameters of any two adjacent first and second holes are different, some of the plural first holes having a larger diameter align with some of the plural second holes having a smaller diameter, and the other of the plural first holes shaving a smaller diameter align with the other the plural second holes having a larger diameter, wherein a diameter of each of the plural third hole is equal to the second diameter of each first hole and each second hole;
   wherein multiple heat dissipation portions of the central disc are defined by the plural third holes of the central disc and the plural first holes of the first disc or are defined by the plural third holes of the central disc and the plural second holes of the second disc.

2. The brake disc structure as claimed in claim 1, wherein the first disc is connected with the first surface in a metallurgical reaction manner, and the second disc is coupled with the second surface in the metallurgical reaction manner, wherein the metallurgical reaction manner includes any one of roll forming, press forming, and diffusing forming.

3. The brake disc structure as claimed in claim 1, wherein the ferrous metal materials include cast iron and stainless steel, and the metal material or the metal alloy material includes any one of magnesium, aluminum, titanium, magnesium alloys, aluminum alloys, and titanium alloys.

4. The brake disc structure as claimed in claim 1, wherein each of the central disc, the first disc, and the second disc is in a circular disk shape.

5. The brake disc structure as claimed in claim 1, wherein the central disc includes a first external rim, the first disc includes a second external rim, and the second disc includes a third external rim, wherein each of the first, second, and third external rims has plural arcuate cutouts.

6. The brake disc structure as claimed in claim 1, wherein the plural first holes are separated from one another and surround the through orifice, and any two adjacent of the plural first holes is defined a first rib.

7. The brake disc structure as claimed in claim 1, wherein the second holes are separated from one another and surround the through orifice, and any two adjacent of the plural second holes is defined a second rib.

8. The brake disc structure as claimed in claim 1, wherein the plural third holes are separated from one another and surround the through orifice, and any two adjacent of the plural third holes is defined a third rib.

9. The brake disc structure as claimed in claim 1, wherein each of the first and second brake faces has multiple openings passing therethrough and adjacent to the second external rim and the third external rim.

10. The brake disc structure as claimed in claim 1, wherein each of the first and second brake faces has multiple apertures passing therethrough and located adjacent to two round lines of the first disc and the second disc, and the multiple apertures are defined among the multiple openings and the through orifice and are evenly arranged around the through orifice.

11. The brake disc structure as claimed in claim 1, wherein each of the plural first holes, the plural second holes, and the plural third holes is in any one of a circular shape, a polygonal shape, and an irregular shape.

12. The brake disc structure as claimed in claim 9, wherein each of the multiple openings is in any one of a circular shape, a polygonal shape, and an irregular shape.

13. The brake disc structure as claimed in claim 10, wherein each of the multiple apertures is in any one of a circular shape, a polygonal shape, and an irregular shape.

14. The brake disc structure as claimed in claim 11, wherein shapes of the plural first holes, the plural second holes, and the plural third holes are identical.

\* \* \* \* \*